United States Patent [19]
Morgan et al.

[11] Patent Number: 5,431,792
[45] Date of Patent: Jul. 11, 1995

[54] METHOD OF MAKING HYPOPHOSPHOROUS ACID

[75] Inventors: Russell J. Morgan, Grand Island; Robert L. Zeller, III, Youngstown, both of N.Y.; Joseph Dealmeida, Carrollton, Tex.

[73] Assignee: Occidental Chemical Corporation, Niagara Falls, N.Y.

[21] Appl. No.: 169,021

[22] Filed: Dec. 20, 1993

[51] Int. Cl.⁶ .............................................. B01D 61/44
[52] U.S. Cl. ................................. 204/182.4; 204/90; 204/98; 204/103
[58] Field of Search .............. 204/103, 182.4, 90, 204/98

[56] References Cited

U.S. PATENT DOCUMENTS

| | | | |
|---|---|---|---|
| 2,976,117 | 3/1961 | Pahud | 23/107 |
| 3,052,519 | 9/1962 | Bianchi et al. | 23/107 |
| 3,787,304 | 1/1974 | Chlanda et al. | 204/182.4 |
| 4,082,835 | 4/1978 | Chlanda et al. | 423/242 |
| 4,107,015 | 8/1978 | Chlanda et al. | 204/182.4 |
| 4,107,264 | 8/1978 | Nagasubramanian et al. | 423/81 |
| 4,219,396 | 8/1980 | Gancy et al. | 204/182.4 |
| 4,265,866 | 5/1981 | Arzoumanidis et al. | 423/304 |
| 4,391,680 | 7/1983 | Mani et al. | 204/98 |
| 4,504,373 | 3/1985 | Mani et al. | 204/182.4 |
| 4,521,391 | 6/1985 | Estes | 423/307 |
| 4,552,635 | 11/1985 | Jenczewski et al. | 204/182.4 |
| 4,629,545 | 12/1986 | Mani et al. | 204/182.4 |
| 4,740,281 | 4/1988 | Chlanda et al. | 204/151 |
| 4,976,838 | 12/1990 | Mani et al. | 204/182.3 |
| 4,999,095 | 3/1991 | Chlanda et al. | 204/182.4 |
| 5,006,211 | 4/1991 | Paleologou et al. | 204/182.4 |
| 5,135,626 | 8/1992 | Mani et al. | 204/182.4 |
| 5,139,632 | 8/1992 | Chlanda et al. | 204/182.4 |
| 5,162,076 | 11/1992 | Chiao et al. | 204/182.4 |
| 5,225,052 | 7/1993 | Takikawa et al. | 204/90 |

FOREIGN PATENT DOCUMENTS

0459751A1 12/1991 European Pat. Off.
92/11080 7/1992 WIPO.

OTHER PUBLICATIONS

K. N. Mani, "Electrodialysis Water Splitting Technology", Journal of Membrane Science, 58, (1991) pp. 117-138.
Abstract, G. E. Revzin et al., Ser. Khim. Nauk (2), 125-9 (1987).
VanWazer, "Phosphorus And Its Compounds", vol. I, p. 359 (1958).

Primary Examiner—John Niebling
Assistant Examiner—Arun S. Phasge
Attorney, Agent, or Firm—Wayne A. Jones; Richard D. Fuerle

[57] ABSTRACT

Disclosed is a method of making hypophosphorous acid from sodium hypophosphite by performing electrodialytic water splitting upon an aqueous solution of sodium hypophosphite. The process can be tied into an existing process for producing sodium hypophosphite wherein the product of the sodium hypophosphite process is used as a starting material in the hypophosphorous acid process and the depleted sodium hypophosphite solution from the hypophosphorous acid process, which contains some hypophosphorous acid, is used to adjust the pH in the sodium hypophosphite process.

23 Claims, 3 Drawing Sheets

METHOD OF MAKING HYPOPHOSPHOROUS ACID

BACKGROUND OF THE INVENTION

This invention relates to a method of making hypophosphorous acid (HPA) using electrodialytic water splitting. It also relates to an improved method of making sodium hypophosphite wherein the sodium hypophosphite is used in an electrodialytic water splitting process to make hypophosphorous acid and the depleted sodium hypophosphite from the electrodialytic water splitting process is used to adjust the pH in the process for making sodium hypophosphite.

Electrodialytic water splitting is a process in which a solution of a salt is subjected to a direct current, decomposing water and causing the anions and cations to pass through anion exchange and cation exchange membranes, respectively, forming an acid and a base in separate compartments. For example, if a solution of sodium chloride is placed between a cation exchange membrane and an anion exchange membrane and is subjected to a direct current, hydrochloric acid will form on the other side of the anion exchange membrane and sodium hydroxide will form the other side of the cation exchange membrane. The concentration of the acid formed is a function of the current density, but the higher the concentration of the acid, the lower will be the current efficiency.

There is also a relationship between the strength of the acid (i.e., how strongly it dissociates to liberate $H^+$) and the concentration of the acid that can be obtained at a particular current efficiency. At the same current efficiency, it is possible to obtain higher concentrations of weak acids than of strong acids. The relationship between the strength of the acid and the concentration of the acid that can be obtained at a given current efficiency can be found in an article by K. N. Mani titled, "Electrodialysis Water Splitting Technology," Journal of Membrane Science, 58 (1991) pps. 117–138 at page 122. (This article is hereinafter referred to as "Mani, 1991".) In that article it states that at a current efficiency of 80% or higher and a current density of 100 mA/cm$^2$ the concentration of a strong acid that can be obtained is about 1 normal and the concentration of a weak acid that can be obtained is about 3 to about 6 normal. Because hypophosphorous acid is a strong monobasic acid, the normality and molarity are equal values (i.e., 1N $H_3PO_2$ = 1M $H_3PO_2$).

Hypophosphorous acid is now produced by the acidification of sodium hypophosphite. For example, one can load a cation exchange resin with hydrogen ions and pass a solution of sodium hypophosphite over the resin so that the sodium ion is exchanged for the hydrogen ion and hypophosphorous acid is produced. Until now, the production of hypophosphorous acid by electrodialytic water splitting has not been suggested or attempted. One possible reason for this is that the readily available references for HPA describe it as a strong acid. As a strong acid, the concentration of HPA that could be produced at a given current efficiency would be low, requiring a choice between high power consumption to make a high concentration of acid and high energy consumption to evaporate water from a low concentration of acid. Van Wazer, *Phosphorus and Its Compounds*, Vol I., page 359 (1958), the definitive reference on phosphorous chemistry, describes HPA as a strong monobasic acid with a dissociation constant of $8.0 \times 10^{-2}$ (pKa=1.1). On the other hand, K. Mani in WO 92/11080 defines a weak acid for the purpose of electrodialytic water splitting as one with a pKa of 3 or greater, but generally less than 11. The electrodialytic water splitting of sodium hypophosphite would therefore be expected to produce hypophosphorous acid having a concentration of about 1 normal at a current efficiency of 80%. Another reason, relating to production in conventional electrolytic membrane cells, may be due to product quality concerns associated with oxidation of the hypophosphorous acid at the anode to produce phosphite anion contamination of the product.

SUMMARY OF THE INVENTION

We have discovered that when hypophosphorous acid is produced by the electrodialytic water splitting of sodium hypophosphite at 80% current efficiency, the concentration of the hypophosphorous acid produced is not the 1 normal concentration that would be expected for a strong acid, but instead is about 2.2 normal. While we are unable to account for the unusually high concentration of hypophosphorous acid that can be obtained, the result is very beneficial because it reduces the amount of evaporation that is needed to produce high concentrations of the acid. As a result, the production of hypophosphorous acid by electrodialytic water splitting may be competitive with other methods of producing that acid.

We have also discovered that the production of hypophosphorous acid by electrodialytic water splitting can be tied into an existing process for producing sodium hypophosphite. That is, the sodium hypophosphite product from an existing process can be used as the starting material in the electrodialytic water splitting process and the depleted sodium hypophosphite salt from the electrodialytic water splitting process, which contains some hypophosphorous acid, can be used to adjust the pH in the existing sodium hypophosphite process. When this is done, the existing sodium hypophosphite process is improved in several ways. The product value of the hypophosphorous acid in the depleted salt stream is recovered instead of being neutralized with the dilute caustic stream prior to resaturation with sodium hypophosphite crystal. This not only allows product acid, which would otherwise be lost, to be effectively utilized in the process, but also allows more of the weak caustic product solution to be utilized as feed in the sodium hypophosphite process. The use of acids other than hypophosphorous acid in the existing sodium hypophosphite process to adjust the pH is eliminated, and therefore the sodium hypophosphite product will contain hypophosphite instead of foreign anions and be purer. This will also reduce the amount of calcium salt waste material that is generated, which has a significant disposal cost. Also, the calcium salt waste material is thixotropic, which means that it releases water when it is shaken, and since it must be disposed of as a solid waste, this is unacceptable for companies that accept solid waste for disposal. The substitution of hypophosphorous acid for other acids in the existing sodium hypophosphite process unexpectedly eliminates this problem.

In addition, the dilute caustic generated in the electrodialytic water splitting process can be incorporated into the sodium hypophosphite process without penalty as a source of NaOH in the phosphorous hydrolysis portion of the process. The dilute caustic can also be used to generate calcium hydroxide from lime needed in the sodium hypophosphite process.

While there are a number of ways of tying together the electrodialytic water splitting process for producing hypophosphorous acid with existing processes for producing sodium hypophosphite, in one method the mother liquor from an existing sodium hypophosphite process, which contains both sodium hypophosphite and sodium phosphite, could be used in the electrodialytic water splitting process. This eliminates the need to purify the liquor and evaporate water from it. Although this liquor contains both phosphite ion and hypophosphite ion, it is believed that the two ions can be at least partially separated in the electrodialytic water splitting process because the hypophosphite ion is smaller than the phosphite ion and can therefore pass more easily through the anion exchange membrane. European Patent Application 0459751A1 also teaches that adjustment of the depleted salt feed to alkaline conditions will improve the separation by forcing the phosphorous anion to become divalent.

The electrodialytic water splitting process for producing hypophosphorous acid can also be tied into the existing ion exchange process for producing hypophosphorous acid. That is, instead of using the ion exchange process to produce all the hypophosphorous acid from sodium hypophosphite, it could instead be used to exchange hydrogen ions for the small concentration of sodium ions in the hypophosphorous acid produced by the electrodialytic water splitting process of this invention. This would lower the overall cost of producing hypophosphorous acid of high purity.

BRIEF DESCRIPTION OF THE DRAWINGS

In FIG. 3 the ordinate is current efficiency and the abscissa is normality (Eq/L).

DESCRIPTION OF THE INVENTION

Figure 1:
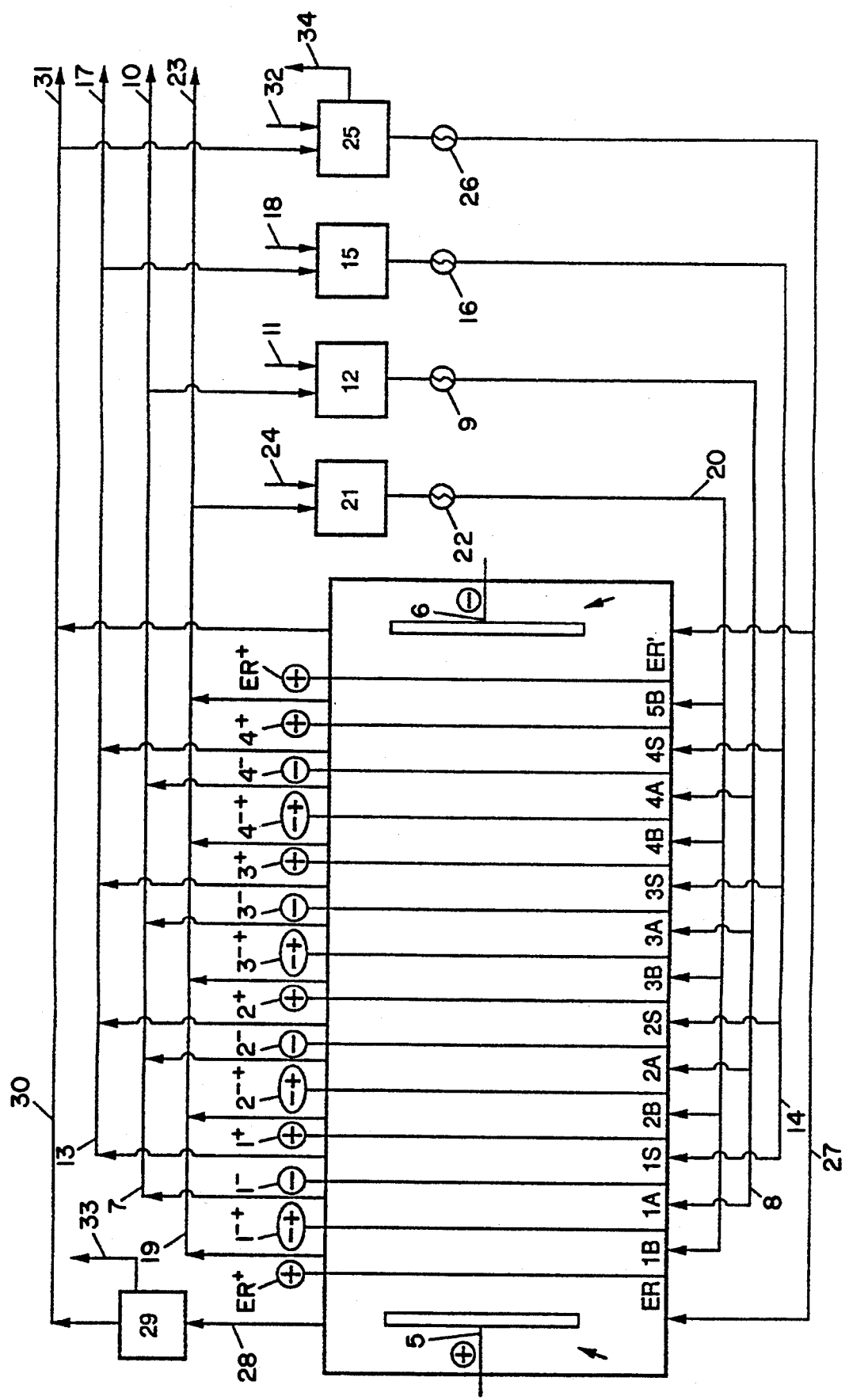
FIG. 1 is a diagrammatic side view which illustrates an electrodialytic water splitting process according to this invention for producing hypophosphorous acid.

FIG. 1 shows an electrolytic cell according to this invention. The cell is formed from four juxtaposed units, 1, 2, 3, and 4. Each unit has an acid compartment, 1A, 2A, 3A, and 4A, a salt compartment, 1S, 2S, 3S, and 4S and a base compartment, 1B, 2B, 3B, and 4B. The anode 5 is in the anode side electrode rinse (ER) acid compartment and the cathode 6 is in the base side electrode rinse (ER') compartment. Separating the acid and salt compartments of each unit are anion exchange membranes $1^-$, $2^-$, $3^-$, and $4^-$ and separating the salt and base compartments are cation exchange membranes $1^+$, $2^+$, $3^+$ and $4^+$. Beginning each unit is a bipolar membrane $1^{-+}$, $2^{-+}$, $3^{-+}$ and $4^{-+}$. The two electrode rinse membranes, $ER^+$, separate the beginning and ending of the unit cells from the electrode compartments and generally consist of commercially available Nafion ® type membranes. The rinse compartments which are fed dilute caustic are segregated from the unit cells in hypophosphorous acid production because the oxidizing environment of the anode compartment could oxidize the reducing acid, generating phosphites which would detrimentally impact product quality. For this reason, the use of electrodialytic water splitting technology represents a distinct improvement over conventional electrolysis and is probably the reason why electrolytic production of HPA has not been reported in the open literature. (Cationic exchange membranes and anionic exchange membranes are commercially available. Bipolar membranes are manufactured by Aquatech Systems, a Division of Allied-Signal, and are described in U.S. Pat. Nos. 2,829,095; 4,116,889; 4,024,043; and 4,082,835; herein incorporated by reference.)

The compartments are sealed by means of gaskets (not shown) and the fluids in the compartments are recirculated to prevent the build-up of ions near the membranes. The fluid in acid compartments 1A, 2A, 3A, and 4A is recirculated through lines 7 and 8 by means of pump 9. Hypophosphorous acid product is removed through line 10 and additional water is added through line 11. The capacity of the recirculating system is increased by means of storage tank 12. Similarly, fluid in salt compartments 1S, 2S, 3S, and 4S is recirculated through lines 13 and 14 and storage tank 15 by means of pump 16. Depleted salt solution is removed through line 17 and additional fresh salt solution is added through line 18. Fluid in base compartments 1B, 2B, 3B, 4B, and 5B is recirculated through lines 19 and 20 and storage tank 21 by means of pump 22 and sodium hydroxide is removed through line 23 while fresh water is added through line 24. Finally, the electrode rinse solution in compartments ER and ER' is recirculated through lines 27, 28, and 30 and storage tanks 25 and 29 by means of pump 26. A purge, if required, can be removed through line 31 while fresh make-up solution can be added through line 32. Oxygen and hydrogen formed in the electrode rinse compartments ER and ER' disengage in vessels 29 and 25 and exit through lines 33 and 34, respectively. The removal of product solution from the respective recirculation loops can be accomplished at any point in the loop as long as the pressure differential between compartments is not influenced by the removal process.

The production of gaseous hydrogen 34, and oxygen 33, occurs only at the anode and cathode. Since the production of these gases increases energy consumption per unit of product, it is advantageous to juxtapose a large number of units using common bipolar membranes in between them to minimize the production of these gases relative to the product streams. However, if the number of units in the cell is too large, power consumption again begins to increase and the total voltage across the stack becomes excessive. While the drawing illustrates only four units, any number of units can be similarly juxtaposed and a typical cell may contain about one to about two hundred units.

To operate the cell, it is assembled and HPA and weak NaOH solutions are circulated through the respective acid and base compartments while an aqueous solution of sodium hypophosphite and HPA is circulated through the salt compartment. A weak solution of caustic is also circulated through the electrode rinse compartments. The salt compartment contains both sodium hypophosphite and HPA because of the inequality between the acid and base current efficiencies. When the base current efficiency is greater than the acid current efficiency, the salt compartment contains sodium hypophosphite and HPA. When the acid current efficiency is greater than the base current efficiency, the salt compartment contains sodium hypophosphite and NaOH. Under most conditions, the base conductivity will be greater than the acid conductivity. The concentration of sodium hypophosphite in the salt loop that is used can vary from about 1 wt. % (based on solution weight) up to saturation (about 55 wt. %), but it is preferably about 5 to about 30 wt. % because at less than about 5 wt. % the solution conductivity drops to a point where cell voltage and heat generation associated with the increased ohmic drop make the operation of the cell difficult, and at over about 55 wt. % there is a risk that sodium hypophosphite may precipitate in the membranes. The HPA concentration in the salt loop can vary from 0 wt. % to the same concentration as the acid compartment (a maximum of about 55 wt. %). The cell can be operated at temperatures between 10° C. and about 50° C., but it is preferable to operate at about 25° to about 40° C. as the cell generates heat and cooling requirements are reduced by operating above room temperature. No pH adjustments are normally required to operate the cell. The current density used is preferably about 50 to about 155 mA/cm$^2$ and the cell voltage can vary from about 1.6 to about 2.5 volts/unit, depending on cell geometry, its operation and current density, but is typically about 1.8 to about 2.0 V/unit, direct current (DC). While recirculation of the fluids is required to prevent damage to the membranes, the rate can vary widely although about 5 to about 15 cm/sec is recommended. The overall reaction in the cell is:

$$NaH_2PO_2 + H_2O \rightarrow NaOH + H_3PO_2.$$

There are a number of ways of operating the cell. In the batch mode, most or part of the fluid in the recirculation system of the acid compartment is removed as product and is partially replaced by fresh water whenever the acid concentration reaches a certain predetermined value. For example, when the hypophosphorous acid concentration reaches a predetermined concentration between 5 and 55 wt. % sufficient acid can be removed and replaced with water to reduce the acid concentration to the lower limit. Preferably, this is done when the acid concentration reaches a predetermined concentration between about 10 and about 30 wt. %. The base and salt loops can be operated in a similar fashion and combinations of batch and continuous processes for the product and feed streams can also be employed.

In the continuous mode of operating the system, acid product is continuously removed and replaced with fresh water to maintain the hypophosphorous acid concentration at a certain predetermined concentration. The concentration of the acid is maximized when there is no water addition to the cell at a given set of operating conditions. While the batch mode of operation is more energy efficient, it requires more careful monitoring of the system and more controls in the system than does the continuous mode.

In both modes it is advantageous to keep the sodium hypophosphite salt concentration feed to the recirculation loop at a uniform level and preferably between 5 and saturation (about 55 wt. %). It is also preferable to keep the sodium hydroxide concentration low to prevent sodium ions from migrating from the base compartment into the acid compartment through the bipolar membrane, which would reduce the concentration of acid and contaminate the remaining acid with salt. A concentration of sodium hydroxide between about 1 and about 20 wt. % is recommended and it is preferable to keep the sodium hydroxide concentration below about 5 wt. %. In order to maximize product quality, the hydrodynamic head of the HPA recirculating loop should be 1 to 2 psi higher than the salt or base recirculating loops. The higher pressure discourages mass transport of NaOH and sodium hypophosphite into the acid compartment. If a pinhole develops in a membrane, operating at higher differential pressures will minimize HPA contamination.

Keeping the sodium hydroxide concentration low increases the acidity of the spent salt solution, which is advantageous if the spent salt solution is to be used for pH adjustment in the existing process for producing sodium hypophosphite. For that purpose, a pH of about 1.5 to about 4 for the depleted salt solution is desirable. Also, if the acid content of the spent salt solution is to be used for pH control in the existing process for producing sodium hypophosphite, the concentration of acid and base in the acid compartment and base compartment, respectively, can be controlled so that the acid content of the spent salt solution is appropriate for that purpose (i.e., so that at least no additional acid is needed in the sodium hypophosphite process to adjust the pH).

The concentration of the hypophosphorous acid in the acid compartment can be increased up to about 55 wt. %, but the current efficiency falls off as the concentration increases and the concentration of sodium in the product acid increases. A current efficiency of 80% at a concentration of 2.23 normal hypophosphorous acid (14.3 wt. %) can be achieved. This is unusually high, a little more than double what the teachings of the prior art would lead one to expect.

Figure 2:
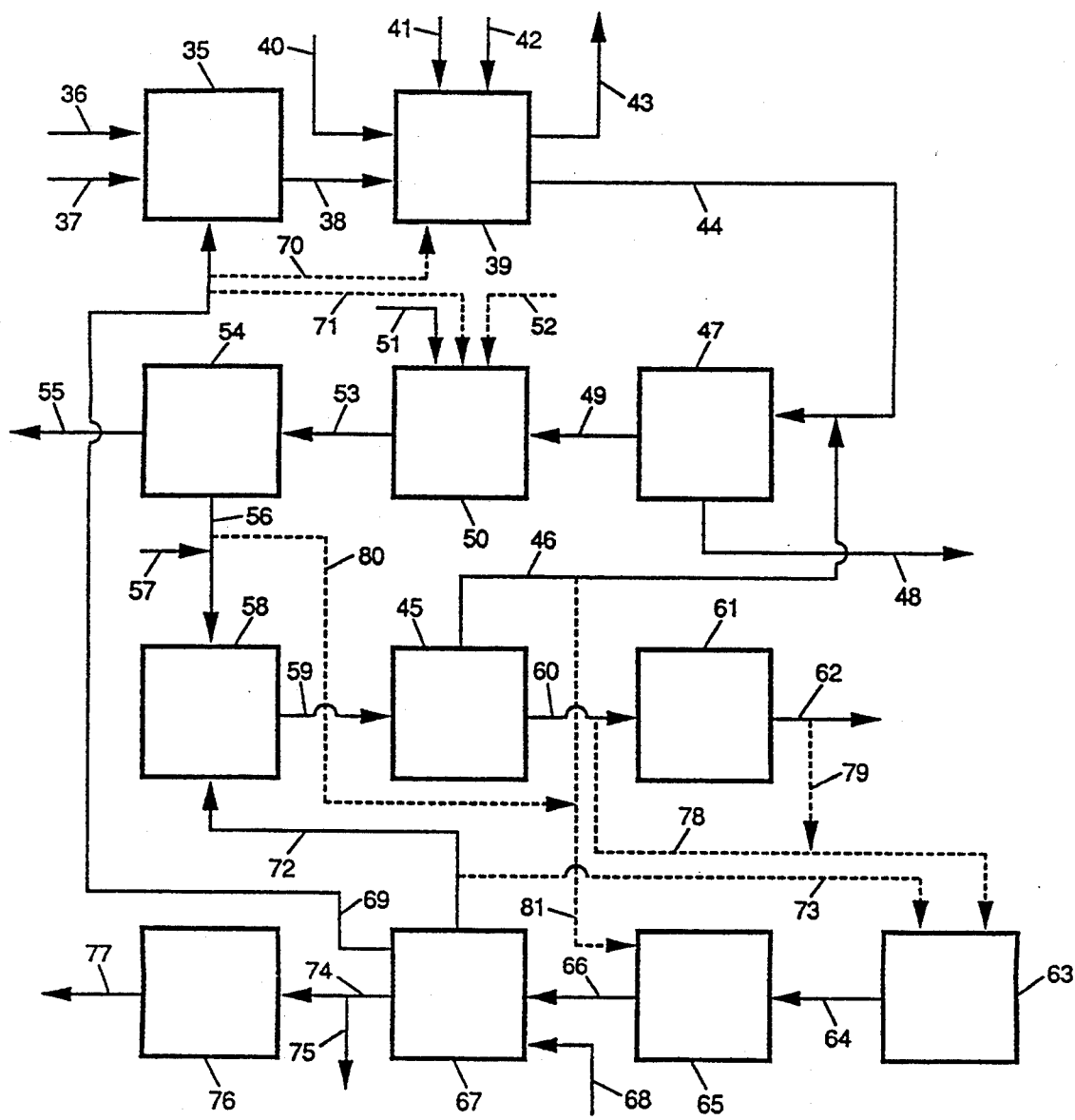
FIG. 2 is a block diagram which illustrates an existing process for producing sodium hypophosphite and shows how the electrodialytic water splitting process for producing hypophosphorous acid according to this invention ties into that existing process.

FIG. 2 illustrates an existing process for producing sodium hypophosphite and shows how the electrodialytic water splitting process of FIG. 1 ties into that process. Calcium hydroxide, produced in mixing vessel 35 is made by mixing water from line 36 with lime (CaO) from line 37. The calcium hydroxide passes through line 38 to reactor 39 where it is mixed with phosphorus-containing water from line 40 and elemental phosphorus from line 41 along with sodium hydroxide from line 42. The reaction:

$$5\ NaOH + 2.5\ P_4 + 3Ca(OH)_2 + 13\ H_2O \rightarrow 5\ NaH_2PO_2\ H_2O + 3CaHPO_3 + 2PH_3 + 4H_2$$

is believed to occur in reactor 39. Phosphine and hydrogen gases are removed from reactor 39 through line 43. The products, a slurry of precipitated calcium phosphite and dissolved calcium hypophosphite in sodium hypophosphite solution, pass through line 44. They are combined with mother liquor from solid/liquid separator 45 from line 46 and are fed to solid/liquid separator 47, where the precipitated calcium phosphite is removed through line 48. The solution of sodium and calcium hypophosphite passes through line 49 to calcium precipitator 50 where sodium carbonate in line 51 is added to precipitate calcium carbonate. The slurry passes through line 53 to calcium carbonate solid/liquid separator 54 where the calcium carbonate is removed through line 55. The liquor of sodium hypophosphite passes through line 56 where, in the existing process, an acid is added through line 57 to lower the pH and precipitate sodium hypophosphite in evaporator/crystallizer 58. The slurry passes through line 59 to solid/liquid separator 45 which separates the mother liquor in line 46 from crystalline sodium hypophosphite. The crystalline hypophosphite in line 60 is dried in dryer 61 and forms the product in line 62. The mother liquor in line 46 is recycled and combined with line 44 which feeds the solid/liquid separator 47. Further details on existing processes for producing sodium hypophosphite which can be combined with the process of this invention for producing hypophosphorous acid can be found in U.S. Pat. Nos. 3,052,519; 2,976,117; 4,521,391; 4,380,531; and EP 459751A1, herein incorporated by reference.

If crystalline sodium hypophosphite is used in the hypophosphorous acid process, it is dissolved in tank 63, then passed through line 64 to cation exchange material 65, which removes any divalent (e.g., calcium and magnesium) ions that may be present as these may damage the ion-exchange membranes. (Depending on the purity of the product formed in the sodium hypophosphite process, ion exchange material 65 may be unnecessary.) The purified sodium hypophosphite passes through line 66 into the salt compartment (and through its recirculation system) of electrolytic cell 67. Water is added to the cell from line 68 and sodium hydroxide produced in the process is removed through line 69 where it is sent to vessel 35 or to reactor 39 (dotted line 70) or to the calcium precipitator 50 (dotted line 71). When the sodium hydroxide or a portion thereof is sent to vessel 50 through dotted line 71, $CO_2$ is added through dotted line 52 in order to generate carbonate in situ. The sodium carbonate entering through line 51 can then be reduced nearly stoichiometrically.

Depleted salt from the hypophosphorous acid process can be recycled through line 72 to crystallizer/evaporator 58. If this is done, it is not necessary to add an acid from line 57 to the sodium hypophosphite liquor. A portion of the depleted salt can be recycled to dissolving tank 63 through line 73. Hypophosphorous acid, which is typically about 10 to about 50 wt. %, is removed through line 74. It can be taken as a product from line 75 or it can be sent to evaporator 76 and concentrated to about 25 to about 70 wt. % and taken as a concentrated product from line 77.

The sodium hypophosphite used in the hypophosphorous acid process can be obtained from various locations in the sodium hypophosphite process. If sodium hypophosphite crystals are used they can be obtained from solid/liquid separator 45 through line 78 or from the product drier through line 79. Alternatively, sodium hypophosphite liquor in line 56 or mother liquor in line 46 can be sent through lines 80 or 81, respectively, to ion exchange bed 65.

The following examples further illustrate this invention.

EXAMPLE 1

A bed volume (BV) of 22 cm³ of Dowex G-24 ion exchange (IX) resin was placed in a column. The IX resin bed had a length to diameter ratio of 6.8. Hypophosphorous acid (15.0 wt. %) with 1522 ppm Na was pumped from a reservoir to the top of the bed. The solution was fed at a rate of 0.144 BV/min. Samples were collected as a function of time and related to the total number of BV which had passed through the column. The ppm Na was measured using a sodium ion selective electrode and the wt. % $H_3PO_2$ was measured by NaOH neutralization to pH 7. The data were collected and are:

| #BV  | ppm Na | wt % $H_3PO_2$ |
|------|--------|----------------|
| 1.1  | 12.2   | 2.8            |
| 3.2  | 5.8    | 14.0           |
| 5.4  | 32     | 15.4           |
| 7.5  | 219    | 15.4           |
| 9.6  | 571    | 15.3           |
| 11.7 | 1185   | 15.2           |
| 13.9 | 1194   | 15.1           |
| 16.1 | 1509   | 15.1           |
| 18.2 | 1537   | 15.2           |
| 20.3 | 1565   | 15.0           |
| 22.5 | 1560   | 15.1           |

The experiment was stopped because the IX resin was saturated with Na+. Approximately 420 ml of deionized water was used to backwash the IX bed and to remove residual $H_3PO_2$. Then, 190 grams of 10 wt. % HCl was used to regenerate the resin, which was subsequently backwashed with approximately 190 ml of deionized water. The column was placed in service again.

Based upon the amount of sodium removed by the IX resin, the capacity was estimated to be 0.61 meq/ml of resin. The reported capacity is 2 meq/ml of resin. Therefore, the resin [H+]/[Na+] ratio is (2−0.61)/0.61=2.27, indicating a much better Na+ selectivity than expected from the literature (e.g., 3.65).

EXAMPLE 2

Hypophosphorous acid (14.9 wt. % with 1540 ppm Na) was pumped from a reservoir to the top of the regenerated bed used in Example 1. The solution was fed at a rate of 0.149 BV/min. Samples were collected and analysis performed in an identical manner as given in Example 1.

| #BV  | ppm Na | wt % $H_3PO_2$ |
|------|--------|----------------|
| 1.3  | 57     | 5.7            |
| 3.5  | 63     | 14.1           |
| 5.7  | 88     | 15.0           |
| 7.9  | 288    | 15.1           |
| 10.1 | 810    | 15.1           |
| 12.4 | 1121   | 14.9           |
| 14.6 | 1461   | 15.0           |
| 16.8 | 1309   | 17.9           |
| 19.1 | 1542   | 14.9           |
| 21.3 | 1535   | 14.9           |
| 23.6 | 1537   | 14.8           |

This example shows that the column can be regenerated and be used to remove sodium from hypophosphorous acid.

Based upon the amount of sodium removed by the IX resin, the capacity was estimated to be 0.66 meq/ml of resin. The reported capacity is 2 meq/ml of resin. Therefore, the resin [H+]/[Na+] ratio is (2−0.66)/0.66=2.03, indicating a much better Na+ selectivity than expected from the literature (e.g., 3.65).

CELL EXAMPLES

In the following examples, a laboratory cell setup was utilized which was similar to those described in WO 92/11080. A laboratory cell which is configured as shown in FIG. 1, was used to accomplish the splitting of sodium hypophosphite into hypophosphorous acid and sodium hydroxide utilizing a combination of anion, cation, and bipolar ion exchange membranes. The cell consisted of two end blocks which were fabricated to form the respective anode and cathode electrode rinse compartments for the cell. The ion exchange membranes, separated one from the other with gaskets, formed the individual acid, base, and salt compartments. The thickness of the gaskets was 50 mils, and the gaskets were cut so as to create an open area of 3.6 square inches central to the gasket to allow solution flow through the exposed faces of the membranes. As an aid to solution distribution across the face of the membranes, expanded plastic mesh was set into the compartment formed by the open area of the gasket and bounded by adjacent membranes. The gaskets were manifolded at the bottom and top of each compartment to create channels of flow for the acid, base, and depleted salt solution entering and exiting the cell stack and to prevent cross contamination of the solutions between the flow channels.

The order of the membrane types, starting from the anode end block, consisted of a cation membrane followed by four sets of three membranes which repeated the pattern bipolar, anion, and cation. The bipolar membranes were oriented so that the anion side always faced the anode. An additional cation exchange membrane followed just ahead of the cathode compartment. Thus, there were a total of 15 compartments consisting of 2 electrode rinse compartments, 5 base compartments, 4 acid compartments, and 4 salt compartments. The anode and cathode compartments were fed an electrode rinse solution which carried gas generated at the electrodes out of the cell, where it separated from the solution in the recirculation reservoir and was vented.

Nafion ® 324 was used as the cation exchange membrane forming the electrode rinse compartments. The bipolar membranes were prepared according to U.S. Pat. No. 4,766,161. The cation exchange membranes were prepared according to U.S. Pat. No. 4,738,764. The anion exchange membranes were from Asahi Glass Co. (sold under the tradename Selemion ® AMV anion permselective membranes). The cell was equipped with a nickel anode and a stainless steel cathode.

Four pumps were used to circulate the acid, base, depleted salt, and the combined electrode rinse solutions in and out of the cell and through calibrated recirculation vessels. These pumps were operated in a such a way so that the linear velocity of the solution in the cell was maintained at about 15 cm/sec. This allowed each cell stream to be operated independently in one of two different modes—batch/semi-batch and continuous.

The cell was powered by a DC constant current rectifier capable of providing 20 amps of current at up to 50 V. A current density of 100 amps per square foot was maintained in all examples. The temperature in the cell was maintained at 35° C.

A 10 wt. % NaOH solution was used for the electrode rinse solution. The anode and cathode electrode rinse solutions exiting the cell were continuously recombined into a common recirculation tank. The acid and base compartments were initially inventoried with hypophosphorous acid and 5% NaOH.

A 25 wt. % sodium hypophosphite solution with a calcium concentration of less than 1 ppm was used to replenish the depleted salt stream and maintain a constant solution conductivity. The 25 wt. % salt solution was prepared by dissolving 25 g of technical grade sodium hypophosphite monohydrate crystal in 75 g of DI water per 100 g of feed solution. The pH of this solution was 7.2. The salt solution was adjusted with caustic in order to raise its pH to 10 and thus facilitate calcium removal via a Duolite C467 ion exchange resin.

Ion exchange was accomplished by passing the salt solution through a column packed with the Duolite resin, which is manufactured by Rohm & Haas. The initial Ca concentration of the 25 wt. % solution was measured by Inductively Coupled Argon Plasma (ICP) to be 8 ppm and that of the final solution <1 ppm.

EXAMPLE 3

This example shows that higher hypophosphorous acid concentrations are obtained at a given current efficiency relative to those reported for other strong acids produced during the electrodialytic splitting of sodium hypophosphite salt into its acid and base components using a three-compartment cell equipped with anion, cation, and bipolar membranes.

In this test, the salt and base streams were operated in a continuous bleed and feed mode. The base loop caustic concentration was maintained at about 5 wt. % NaOH with water addition. The salt loop was operated to maintain a conductivity of 40–50 millisiemens/centimeter (ms/cm) though the continuous addition of the 25 wt. % sodium hypophosphite feed solution.

The hypophosphorous acid loop was operated in a batch configuration without water addition. Hypophosphorous acid (0.5N) was used to initially inventory the cell. Product was periodically removed from the acid recirculation loop to reduce the product liquor inventory.

This experiment operated for a total of about 450 minutes. During that time, a total of approximately 1100 ml of 2.2N hypophosphorous acid product was obtained including about 600 ml of 2N acid removed during the operation of the cell and about 510 ml of 2.5N acid remaining in the acid recirculation loop. The concentration of sodium in the product acid was measured to be 900 and 1080 ppm, respectively. The concentration of the depleted salt was about 0.8 molar (50 ms/cm). The potential across the cell was found to be about 1.8 volts/unit cell. The information in the attached tables details this experimental run.

TABLE 1

EXAMPLE 3 - ACID LOOP

| Time (Min.) | $H_3PO_2$ Normality (Eq/L) | Volume (ml) | Cumulative Acid Current Efficiency (%) | Current Efficiency Per Sampling Period (%) | Avg. $[H_3PO_2]$ for Sample Period (N) |
|---|---|---|---|---|---|
| 0 | 0.5 | 800 | | | |
| 78 | 0.95 | 852 | 84 | 84.42 | 0.725 |
| 187 | 1.485 | 935 | 85 | 85.44 | 1.2175 |
| 234 | 1.66 | 965 | 83 | 73.03 | 1.5725 |
| 234 | 1.66 | 865* | | | |
| 297 | 1.93 | 909 | 82 | 81.30 | 1.795 |
| 297 | 1.93 | 809* | | | |
| 368 | 2.2 | 861 | 81 | 75.39 | 2.065 |
| 368 | 2.2 | 661* | | | |
| 420 | 2.4 | 696 | 79 | 66.87 | 2.3 |
| 420 | 2.4 | 496* | | | |
| 450 | 2.525 | 513 | 78 | 56.25 | 2.4625 |

*Solution removed from the Acid Recirculation Loop

TABLE 2

EXAMPLE 3 - BASE LOOP

| Interval (Min.) | NaOH Normality (Eq/L) | Flow Rate (ml/Min) | Base Current Efficiency (%) | Water Make-up (ml/Min) |
|---|---|---|---|---|
| 178 | 1.53 | 3.6 | 89 | 3.302 |
| 10 | 1.457 | 3.65 | 87 | 3.306 |

TABLE 2-continued

EXAMPLE 3 - BASE LOOP

| Interval (Min.) | NaOH Normality (Eq/L) | Flow Rate (ml/Min) | Base Current Efficiency (%) | Water Make-up (ml/Min) |
|---|---|---|---|---|
| 142 | 1.425 | 3.55 | 81 | 3.321 |

TABLE 3

EXAMPLE 3 - SALT LOOP

| Feed (ml/Min.) | Depleted Salt (ml/Min) | H3PO2 Normality (Eq/L) | Conductivity (ms/cm) |
|---|---|---|---|
| 2.2 | 0.94 | 0.23 | 41.5 |
| 2.259 | 1.091 | 0.21 | 48.5 |

Figure 3:
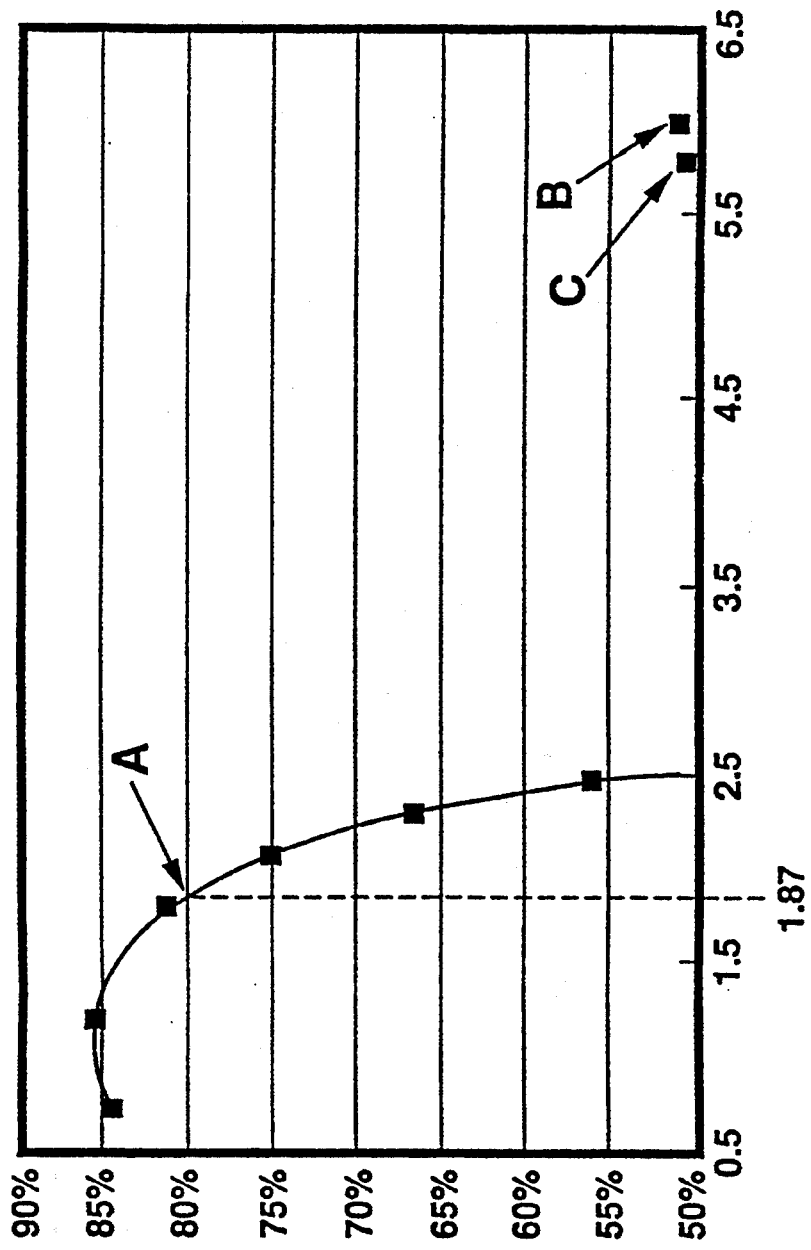
FIG. 3 is a graph giving the results of Examples 3, 4, and 5.

The cumulative current efficiencies (CE) shown in Table 1 show that 2.2N hypophosphorous acid can be generated on a batch basis. This is significantly higher than the 1N concentration and 80% CE reported in the open literature for strong acids (Mani, 1991). Table 1 also shows that if current efficiencies are calculated for each discrete sampling period, the concentration of hypophosphorous acid can be expected to be about 1.87 at 80% CE (see FIG. 3, line A). As the FIG. 3 indicates, this CE is lower than the cumulative efficiency since the early part of the batch cycle operates at high current efficiency when the hypophosphorous acid concentration is relatively low. This data provides some insight as to how a cell operating in a continuous bleed and feed mode would operate at a given current efficiency. For example, a 56% CE would be predicted for a cell operating at 2.5N $H_3PO_2$.

The sodium concentration in the 600 ml of 2.0 normal product hypophosphorous acid collected during the experimental run was found to be 900 ppm, while that of the residual product liquor in the acid recirculation loop was 1080 ppm. These concentrations are slightly lower than those reported as being typical by Mani, 1991, at equivalent acid and base concentrations. The base normality was 1.32. Table 4 summarizes the experimental results for this example and Examples 4 and 5 and compares the results to those predicted in Mani, 1991.

TABLE 4

Acid Loop Sodium Contamination

| Acid Nor. | Mole % Na 100% HPA Basis | Wt % HPA | Dens. g/cc | % Na As-is | Source |
|---|---|---|---|---|---|
| 2.00 | 2.05 | 12.30 | 1.100 | 0.0897 | Actual - Example 3 |
| 2.50 | 2.01 | 15.10 | 1.116 | 0.1077 | Actual - Example 3 |
| 5.70 | 2.65 | 33.33 | 1.180 | 0.3156 | Actual - Example 4 |
| 5.70 | 4.42 | 33.33 | 1.180 | 0.5370 | Actual - Example 5 |
| 1.00 | 2.5 | 6.75 | 1.081 | 0.0379 | Predicted, Mani 1991 |

The table shows that at 2.0 normal hypophosphorous acid, the actual product contamination was about 2.0 mole % sodium vs. 2.5 mole % predicted by Mani, 1991.

EXAMPLE 4

This example demonstrates the continuous mode of operation for a bipolar membrane cell and supports the conclusion expressed in Example 3 that concentrations of hypophosphorous acid significantly higher than 1N are possible at a given current efficiency during the electrodialytic splitting of sodium hypophosphite salt into its acid and base components using a three-compartment cell equipped with anion, cation, and bipolar membranes.

In this test, the salt and base streams were operated in a continuous bleed and feed mode. The base loop caustic concentration was maintained at about 5 wt. % NaOH with water addition. The salt loop was operated to maintain a conductivity of 70 ms/cm through the continuous addition of the 25 wt. % sodium hypophosphite feed solution.

The hypophosphorous acid loop was operated in a continuous configuration without water addition. In this mode of operation, product was allowed to continuously overflow the hypophosphorous acid recirculation loop into a product collection vessel. Hypophosphorous acid (5.0N) was used to initially inventory the cell.

This experiment operated for a total of about 430 minutes. During that time, a total of approximately 210 ml of 5.7N hypophosphorous acid product was obtained. The concentration of sodium in the product acid was measured to be 3156 ppm. The concentration of hypophosphorous acid approached 6N on a steady state basis. The depleted salt concentration was about 0.9 molar $NaH_2PO_2 \cdot H_2O$. The potential across the cell was found to be about 1.8 volts/unit cell. The information in the attached tables details this experimental run.

TABLE 5

EXAMPLE 4 - ACID LOOP

| Time Interval (Min.) | Cumulative Time (Min.) | [$H_3PO_2$] (M) | Acid Flow Rate (ml/Min.) | Current Efficiency (%) |
|---|---|---|---|---|
| 97 | 97 | 5.45 | 0.535 | 46.89 |
| 60 | 157 | 5.7 | 0.517 | 47.40 |
| 45 | 202 | 5.75 | 0.52 | 48.09 |
| 46 | 248 | 5.8 | 0.509 | 47.48 |
| 54 | 302 | 5.85 | 0.518 | 48.74 |
| 54 | 356 | 6 | 0.511 | 49.31 |
| 40 | 396 | 6 | 0.525 | 50.66 |

TABLE 5

EXAMPLE 4 - ACID LOOP

| Time Interval (Min.) | Cumulative Time (Min.) | [$H_3PO_2$] (M) | Acid Flow Rate (ml/Min.) | Current Efficiency (%) |
|---|---|---|---|---|
| 97 | 97 | 5.45 | 0.535 | 46.89 |
| 60 | 157 | 5.7 | 0.517 | 47.40 |
| 45 | 202 | 5.75 | 0.52 | 48.09 |
| 46 | 248 | 5.8 | 0.509 | 47.48 |
| 54 | 302 | 5.85 | 0.518 | 48.74 |
| 54 | 356 | 6 | 0.511 | 49.31 |
| 40 | 396 | 6 | 0.525 | 50.66 |

TABLE 6

EXAMPLE 4 - BASE LOOP

| Time Interval (Min) | Cumulative Time (Min) | [NaOH] (M) | Base Flow Rate (ml/Min) | Water Make-up (ml/Min) | Caustic Current Efficiency (%) |
|---|---|---|---|---|---|
| 101 | 101 | 1.375 | 3.47 | 3.29 | 76.74 |
| 114 | 215 | 1.4 | 3.036 | 2.89 | 68.36 |

TABLE 6-continued

EXAMPLE 4 - BASE LOOP

| Time Interval (Min) | Cumulative Time (Min) | [NaOH] (M) | Base Flow Rate (ml/Min) | Water Make-up (ml/Min.) | Caustic Current Efficiency (%) |
|---|---|---|---|---|---|
| 102 | 317 | 1.495 | 2.894 | 2.71 | 69.59 |
| 97 | 414 | 1.52 | 2.771 | 2.7 | 67.74 |

TABLE 7

EXAMPLE 4 - SALT LOOP

| Time Interval (Min.) | Cumulative Time (Min.) | Feed Rate (ml/Min.) | Depleted Salt Flow Rate | [H$_3$PO$_2$] (M) |
|---|---|---|---|---|
| 97 | 97 | 2.17 | 1.38 | 0.47 |
| 121 | 218 | 2.34 | 1.44 | 0.64 |
| 208 | 426 | 2.35 | 1.44 | 0.68 |

The acid product data in Table 5 shows that a current efficiency of 51% is possible at a hypophosphorous acid concentration of 6 molar. Contrasting this information with the batch operation described in Example 3, Table 1, it can be seen that at 2.5 molar, the current efficiency per sampling period is about 56%. These two drastically different hypophosphorous acid concentrations at about equivalent current efficiencies provide additional support to the conclusion that acid concentrations significantly higher than those reported in the open literature for strong acids are possible during the bipolar membrane electrodialyses of sodium hypophosphite into hypophosphorous acid and sodium hydroxide. The data also indicates that the concentrations attainable in Example 3 at various current efficiencies for sampling periods may in fact be conservative in contrast to what is attainable under continuous operation. Evidenced by the shape of the curve for the batch/semi-batch data (see FIG. 3, line B), the nearly 6 molar acid concentration would not be expected based on the batch/semi-batch data.

The concentration of sodium in the hypophosphorous acid was measured in a 5.7 molar composite sample collected during the run. The analyses showed the sample contained 3156 ppm Na. Table 4 compares this result to those of Example 3. The result on a mole percent basis is about that predicted by Mani, 1991 for 1 molar acid vs the 5.7 molar acid generated in this example.

EXAMPLE 5

This example demonstrates the continuous mode of operation for a bipolar membrane cell and supports the conclusion expressed in Example 3 that concentrations of hypophosphorous acid significantly higher than 1N are possible at a given current efficiency during the electrodialytic splitting of sodium hypophosphite salt into its acid and base components using a three-compartment cell equipped with anion, cation, and bipolar membranes.

In this test, the salt and base streams were operated in a continuous bleed and feed mode. The base loop caustic concentration was maintained at about 5 wt. % NaOH with water addition. The salt loop was operated to maintain a conductivity of 70 ms/cm through the continuous addition of the 25 wt. % sodium hypophosphite feed solution.

The hypophosphorous acid loop was operated in a continuous configuration without water addition. In this mode of operation, product was allowed to continuously overflow the hypophosphorous acid recirculation loop into a product collection vessel. Hypophosphorous acid (5.0N) was used to initially inventory the cell.

This experiment operated for a total of about 450 minutes. During that time, a total of approximately 240 ml of 5.7 N hypophosphorous acid product was obtained. The concentration of sodium in the product acid was measured to be 5370 ppm. The concentration of hypophosphorous acid approached 5.8N on a steady state basis. The depleted salt concentration was about 0.85 molar NaH$_2$PO$_2$.H$_2$O. The potential across the cell was found to be about 1.8 volts/unit cell. The information in the attached tables details this experimental run.

TABLE 8

EXAMPLE 5 - ACID LOOP

| Time Interval (Min.) | Cumulative Time (Min.) | [H$_3$PO$_2$] (M) | Acid Flow Rate (ml/Min.) | Current Efficiency (%) |
|---|---|---|---|---|
| 81 | 81 | 5.1 | 0.47 | 38.55 |
| 71 | 152 | 5.35 | 0.55 | 47.33 |
| 45 | 197 | 5.45 | 0.56 | 49.09 |
| 90 | 287 | 5.8 | 0.54 | 50.37 |
| 92 | 379 | 5.8 | 0.54 | 50.37 |

TABLE 9

EXAMPLE 5 - BASE LOOP

| Time Interval (Min.) | Cumulative Time (Min.) | [NaOH] (M) | Base Flow Rate ml/Min | Water Make-up ml/Min | Current Efficiency (%) |
|---|---|---|---|---|---|
| 95 | 95 | 1.32 | 2.99 | 2.75 | 63.48 |
| 37 | 132 | 1.4 | 2.84 | | 63.95 |
| 20 | 152 | 1.26 | 3.36 | 2.78 | 68.09 |
| 39 | 191 | 1.26 | 3.26 | | 66.06 |
| 140 | 331 | 1.26 | | | |
| 36 | 367 | 1.56 | 3.1 | 2.78 | 77.78 |

TABLE 10

EXAMPLE 5 - SALT LOOP

| Time Interval (Min.) | Cumulative Time (Min.) | Feed Rate (ml/Min.) | Depleted Salt Flow Rate | [H$_3$PO$_2$] (M) |
|---|---|---|---|---|
| 75 | 75 | 2.033 | 1.17 | 0.79 |
| 41 | 116 | 2.033 | 1.17 | 0.69 |
| 85 | 201 | 2.033 | 1.14 | 0.63 |
| 35 | 236 | 2.033 | 1.14 | 0.64 |

The acid product data in Table 5 shows that a current efficiency of 50% is possible at a hypophosphorous acid concentration of 5.8 molar. Again, contrasting this information with the batch operation described in Example 3, Table 1, it can be seen that at 2.5 molar, the current efficiency per sampling period is about 56%. The difference in hypophosphorous acid concentrations at about equivalent current efficiencies, as in Example 4, supports the conclusion that acid concentrations significantly higher than those reported in the open literature for strong acids are possible during the bipolar membrane electrodialyses of sodium hypophosphite into hypophosphorous acid and sodium hydroxide. A comparison of Example 4 with Example 5 shows that the concentration and current efficiency results are reproducible. The data also indicates that the concentrations attainable in Example 3 at various current efficiencies for sampling periods may in fact be conservative in contrast to what is attainable under continuous operation. Evidenced by the shape of the curve for the batch-/semi-batch data (see FIG. 3, line C), the nearly 5.8 molar acid concentration would not be expected based on the batch/semi-batch data.

The concentration of sodium in the hypophosphorous acid was measured in a 5.7 molar composite sample collected during the run. The analyses showed the sample contained 5170 ppm Na. Table 4 compares this result to those of Examples 3 and 4. The result on a mole percent basis is higher than that predicted by Mani, 1991.

We claim:

1. A method of making hypophosphorous acid and sodium hydroxide from sodium hypophosphite comprising performing electrodialytic water splitting upon an aqueous solution of said sodium hypophosphite.

2. A method according to claim 1 wherein said electrodialytic water splitting is performed in an electrolytic cell having the structure Anode-A-AM-[S-CM-B-BM-A-AM]$_n$-S-CM-B-Cathode where CM is a cationic exchange membrane, B is a base compartment containing an aqueous solution of sodium hydroxide product, BM is a bipolar ion exchange membrane, A is an acid compartment containing an aqueous solution of hypophosphorous acid product, AM is an anion exchange membrane, S is a salt compartment containing an aqueous solution of sodium hypophosphite, and n is 1 to 200.

3. A method according to claim 1 wherein said electrodialytic water splitting is performed in an electrolytic cell having the structure Anode-ER-CM-B-BM-A-AM-[S-CM-B-BM-A-AM]$_n$-S-CM-B-CM-ER-Cathode where CM is a cationic exchange membrane, B is a base compartment containing an aqueous solution of sodium hydroxide product, BM is a bipolar ion exchange membrane, A is an acid compartment containing an aqueous solution of hypophosphorous acid product, AM is an anion exchange membrane, S is a salt compartment containing an aqueous solution of sodium hypophosphite, ER is an electrode rinse compartment, and n is 1 to 200.

4. A method according to claim 1 wherein said electrodialytic water splitting is performed in an electrolytic cell comprising
   (1) an anode electrode rinse compartment housing an anode;
   (2) a cathode electrode rinse compartment housing a cathode;
   (3) a series of at least two juxtaposed units in between said anode electrode rinse compartment and said cathode electrode rinse compartment, where each unit comprises
      (a) a base compartment containing an aqueous solution of sodium hydroxide product;
      (b) an acid compartment containing an aqueous solution of hypophosphorous acid product;
      (c) a salt compartment containing an aqueous solution of sodium hypophosphite and hypophosphorous acid;
      (d) a bipolar ion exchange membrane between each base compartment and adjacent acid compartment; and
      (e) an anion exchange membrane between each acid compartment and adjacent salt compartment, where each salt compartment is separated from each base compartment cation exchange membrane and the base compartment at one end of said series is adjacent to said anode electrode rinse compartment and is separated therefrom by a cation exchange membrane, and the salt compartment at the opposite end of said series is adjacent to an additional base compartment which is adjacent to said cathode electrode rinse compartment, and said additional base compartment is separated from said cathode electrode rinse compartment by a cation exchange membrane;
   (4) means for circulating said aqueous solution of sodium hydroxide product through said base compartments;
   (5) means for circulating said aqueous solution of sodium hypophosphite and hypophosphorous acid through said salt compartments;
   (6) means for circulating said aqueous solution of hypophosphorous acid through said acid compartments;
   (7) means for circulating aqueous electrode rinse solutions through said electrode rinse compartments;
   (8) means for adding water to said acid compartment;
   (9) means of adding water to said base compartment; and
   (10) means of adding an aqueous solution of sodium hypophosphite to said salt compartment.

5. A method according to claim 4 wherein the concentration of said aqueous solution of sodium hypophosphite is about 5 wt. % to about saturation.

6. A method according to claim 4 wherein the concentration of said aqueous solution of sodium hypophosphite and hypophosphorous acid in the salt compartment is about 1 to 50 wt. % and 0 to 55 wt. %, respectively.

7. A method according to claim 4 wherein the temperature of said cell is about 10° to about 45° C.

8. A method according to claim 4 wherein the current density in said cell is about 50 to about 155 mA/cm$^2$.

9. A method according to claim 4 wherein the linear solution velocities of said aqueous solutions through said cell are about 2 to about 15 cm/sec.

10. A method according to claim 4 wherein a portion of said hypophosphorous acid and sodium hydroxide solutions is continuously drawn off and replaced with water and a portion of said sodium hypophosphite and hypophosphorous acid solution is continuously drawn off and replaced with fresh sodium hypophosphite solution.

11. A method according to claim 4 wherein, whenever a predetermined concentration of hypophosphorous acid is reached in said hypophosphorous acid solution, a portion of said hypophosphorous acid solution is drawn off.

12. A method according to claim 4 wherein the concentration of sodium hydroxide in said sodium hydroxide solution is maintained at less than 10 wt. %.

13. A method according to claim 4 wherein the pressure in the acid compartments is about 1 to about 3 psi greater than the pressure in the base and salt compartments.

14. A method according to claim 4 including the additional last step of using at least a portion of said sodium hypophosphite and hypophosphorous acid solution to adjust the pH of a second aqueous sodium hypophosphite solution prior to the evaporation and crystallization of said second aqueous sodium hypophosphite solution.

15. A method according to claim 14 wherein the concentration of said hypophosphorous acid in said hypophosphorous acid solution and the concentration of said sodium hydroxide in said sodium hydroxide solution are controlled so that the acid content of said sodium hypophosphite and hypophosphorous acid solution is the content needed to reduce the pH of said second aqueous sodium hypophosphite solution to the desired pH.

16. A method according to claim 4 including the additional last step of passing at least a portion of said hypophosphorous acid solution through cation exchange material loaded with hydrogen ions to replace sodium ions that may be present in said solution with hydrogen ions.

17. A method of making hypophosphorous acid in an electrodialytic water splitter cell having about 2 to about 200 juxtaposed units, where said cell comprises
   (1) an anode electrode rinse compartment housing an anode;
   (2) a cathode electrode rinse compartment housing a cathode;
   (3) a series of juxtaposed units in between said anode electrode rinse compartment and said cathode electrode rinse compartment, where each unit comprises
      (a) a base compartment containing an aqueous solution of sodium hydroxide product;
      (b) an acid compartment containing an aqueous solution of hypophosphorous acid;
      (c) a salt compartment containing an aqueous solution of sodium hypophosphite and hypophosphorous acid;
      (d) a bipolar ion exchange membrane between each base compartment and adjacent acid compartment; and
      (e) an anion exchange membrane between each acid compartment and adjacent salt compartment, where each salt compartment is separated from each base compartment by a cation exchange membrane and the base compartment at one end of said series is adjacent to said anode electrode rinse compartment and is separated therefrom by a cation exchange membrane, and the salt compartment at the opposite end of said series is adjacent to an additional base compartment which is adjacent to said cathode electrode rinse compartment, and said additional base compartment is separated from said cathode electrode rinse compartment by a cation exchange membrane;
   (4) means for circulating said aqueous solution of sodium hydroxide product through said base compartments; and
   (5) means for circulating said aqueous solution of sodium hypophosphite and hypophosphorous acid through said salt compartments; comprising and
   (6) means for circulating said aqueous solution of hypophosphorous acid through said acid compartments;
   (7) means of circulating aqueous electrode rinse solutions through said electrode rinse compartments;
   (A) adding water to said acid and base compartments;
   (B) adding an aqueous solution of about 5 to about saturation of sodium hypophosphite to said salt compartments;
   (C) maintaining the temperature in said series of units at about 10° to about 45° C.;
   (D) passing direct current through said series of units at a density of about 50 to about 155 mA/cm$^2$, whereby said sodium hypophosphite and water react in said cell to produce an aqueous solution of hypophosphorous acid in said acid compartments and an aqueous solution of sodium hydroxide in said base compartments;
   (E) maintaining the concentration of sodium hydroxide in said base compartments at less than about 10 wt. % by replacing at least a portion of said sodium hydroxide solution with water;
   (F) maintaining the concentration of sodium hypophosphite in said salt compartments at about 5 to about saturation by drawing off depleted sodium hypophosphite solution from said salt compartments and replacing said drawn off solution with fresh aqueous sodium hypophosphite solution having a concentration of about 5 to about saturation;
   (G) removing hypophosphorous acid solution from said acid compartments and replacing said removed hypophosphorous acid solution with water; and
   (H) maintaining the pressure in the acid compartment at about 1 to about 3 psi greater than the pressure in the base and salt compartments.

18. A method according to claim 17 wherein a portion of said hypophosphorous acid solution is removed from said acid compartments and is replaced with water whenever the concentration of hypophosphorous acid in said compartments reaches about 10 to about 55 wt. %.

19. A method according to claim 18 wherein a portion of said hypophosphorous acid solution is continuously removed from said acid compartments and is continuously replaced with water in order to maintain the concentration of hypophosphorous acid in said compartments below a concentration between about 10 and about 30 wt. %.

20. A method according to claim 17 wherein a portion of said hypophosphorous acid solution is continuously removed from said acid compartments without replacement with water in order to obtain the maximum concentration of hypophosphorous acid possible in said compartments.

21. A method according to claim 17 wherein the concentration of hypophosphorous acid in said salt compartments is maintained at about 0 to about 55 wt. % by drawing off depleted salt solution from said salt compartments and replacing it with about 0 to about 55 wt. % aqueous sodium hypophosphite solution.

22. A method according to claim 17 including the additional last step of passing at least a portion of said hypophosphorous acid solution through cation exchange material loaded with hydrogen ions to replace sodium ions that may be present in said solution with hydrogen ions.

23. In a process for making sodium hypophosphite wherein the pH of a sodium hypophosphite aqueous liquor is lowered with an acid other than hypophosphorous acid prior to evaporative crystallization of sodium hypophosphite, a method of producing hypophosphorous acid from at least a portion of the sodium hypophosphite thereby produced, comprising
   (a) performing electrodialytic water splitting upon an aqueous solution of at least a portion of said sodium hypophosphite to produce said hypophosphorous acid and a depleted sodium hypophosphite solution containing hypophosphorous acid; and
   (b) replacing said other acid with at least a portion of said depleted sodium hypophosphite solution.

* * * * *